United States Patent
Derevyagin (10) Patent No.: US 9,995,614 B2
(45) Date of Patent: Jun. 12, 2018

(54) FLUID FLOW RATE MEASURING DEVICE INCLUDING A DIVERTING UNIT FOR DIVERTING THE FLOW INTO A MEASURING SECTION

(71) Applicant: Alexandr Mikhailovich Derevyagin, Moscow (RU)

(72) Inventor: Alexandr Mikhailovich Derevyagin, Moscow (RU)

(*) Notice: Subject to any disclaimer, the term of this patent is extended or adjusted under 35 U.S.C. 154(b) by 0 days. days.

(21) Appl. No.: 15/036,775

(22) PCT Filed: Nov. 14, 2014

(86) PCT No.: PCT/RU2014/000869
§ 371 (c)(1),
(2) Date: May 13, 2016

(87) PCT Pub. No.: WO2015/072894
PCT Pub. Date: May 21, 2015

(65) Prior Publication Data
US 2016/0282164 A1 Sep. 29, 2016

(30) Foreign Application Priority Data
Nov. 15, 2013 (RU) ................................ 2013151048

(51) Int. Cl.
*G01F 15/18* (2006.01)
*G01F 1/66* (2006.01)
(52) U.S. Cl.
CPC ............ *G01F 15/185* (2013.01); *G01F 1/662* (2013.01); *G01F 15/18* (2013.01)

(58) Field of Classification Search
None
See application file for complete search history.

(56) References Cited

U.S. PATENT DOCUMENTS 2,881,012 A 4/1959 Rings
4,325,262 A 4/1982 Meisser et al.
(Continued)

FOREIGN PATENT DOCUMENTS

FR 2942534 A3 8/1920
GB 716771 A 10/1954

OTHER PUBLICATIONS

International Search Report and Written Opinion issued by the European Patent Office, dated Mar. 19, 2015 for related International Application No. PCT/RU2014/000869; 10 pages.

*Primary Examiner* — Harshad R Patel
(74) *Attorney, Agent, or Firm* — Faegre Baker Daniels LLP (57) ABSTRACT

Measurement device for determining the flow rate of a fluid flowing in a pipe in a main flow direction, comprises a diverting unit connected to the pipe and adapted to divert the fluid flow from the axis of the main flow direction in the pipe and directing the flow to a measuring section, the diverting unit is a sealed reservoir having an inlet portion connected to an inlet pipe, an outlet portion connected to an outlet pipe and a diverting portion connected to the inlet portion and the outlet portion and comprising a tubular member disposed in the diverting portion and the outlet portion, the tubular member has a measuring section comprising fluid flow rate meter, and a connecting section for connecting the tubular member to the outlet pipe.

22 Claims, 7 Drawing Sheets

(56) References Cited

U.S. PATENT DOCUMENTS

| | | | |
|---|---|---|---|
| 2003/0070718 A1* | 4/2003 | Benham | F15D 1/14 137/861 |
| 2005/0260043 A1* | 11/2005 | Lange | B65G 53/30 406/136 |
| 2010/0107776 A1* | 5/2010 | Shanahan | G01F 1/60 73/861.11 |
| 2011/0226068 A1 | 9/2011 | Dietz et al. | |
| 2012/0144911 A1* | 6/2012 | Moliere | G01M 9/065 73/147 |

* cited by examiner

FLUID FLOW RATE MEASURING DEVICE INCLUDING A DIVERTING UNIT FOR DIVERTING THE FLOW INTO A MEASURING SECTION

CROSS-REFERENCE TO RELATED APPLICATIONS

This application is a U.S. national phase application under 35 U.S.C. § 371 of International Application No. PCT/RU2014/000869, filed Nov. 14, 2014, which claims priority to Russian Patent Application No. 2013151048, filed Nov. 15, 2013, the disclosures of which are expressly incorporated herein by reference in their entirety.

FIELD OF THE INVENTION

The invention relates to measurement of parameters of a fluid flow through a pipe. In particular, the invention can be used for determining the flow rate of fluids such as oil, gas, water or combinations thereof.

DESCRIPTION OF THE PRIOR ART

Devices for measuring the flow rate of fluids are known in the art.

Disadvantages of conventional devices are caused by the presence of turbulent flow in the measurement area, which impairs the measurement accuracy.

To reduce the effect of flow turbulence in the measurement area it is recommended to mount a flow meter on straight segments having a constant cross-section at the length of 5 to 10 diameters of the pipe upstream and downstream the flow meter. However, the provision of such long straight sections requires considerable expenditures and extra space for arrangement thereof. Furthermore, the accuracy of maintaining straightness throughout the site must also be observed. On small diameter pipes the straightness is provided automatically in most cases. But as diameter of the pipe increases the observance and control of the required straightness becomes more difficult. Also, the measurement accuracy of the flow meter is impaired by periodic low-frequency oscillations associated with fluctuations in hydrostatic pressure, such as oscillations due to the presence of a pumping station.

The most relevant prior art is disclosed in RU 2011109911, which provides an ultrasonic measurement device for determining the flow rate of a fluid flowing in a pipe in a main flow direction, wherein the ultrasonic measurement device has an ultrasonic measurement area with at least one pair of ultrasonic transducers, a data processing unit for determining the flow rate from the difference in transit time of ultrasound emitted and received in downstream and upstream direction, and a diverting unit by which the fluid can be diverted from the main flow direction and fed to the ultrasonic measurement area, characterized in that the diverting unit forms a loop.

To eliminate the effect of turbulence on determination of flow parameters, RU 2011109911 provides a flow meter structure with a diverting unit in the form of a loop as a means for eliminating the turbulence. Fluid flow passing through the loop, which is smooth and has no sharp changes in the direction or constrictions, acquires uniform characteristics of the flow profile, and as a result the interference caused by turbulence is eliminated and the accuracy of measurements is improved.

However, in RU 2011109911 high geometric accuracy of components of the loop-shaped diverting unit must be observed at all stages of its manufacture. Furthermore, the disclosed flow meter structure cannot eliminate the impact of periodic low-frequency oscillations associated with fluctuations in the hydrostatic pressure caused, for example, by operation of a pump.

To overcome the aforementioned drawbacks measurement device for determining the flow rate of a fluid flowing in a pipe in a main flow direction is provided, wherein measurement device comprises a diverting unit connected to the pipe and adapted to divert the fluid flow from the axis of the main flow direction in the pipe and directing the flow to a measuring section, wherein the diverting unit comprises an inlet portion connected to an inlet pipe, an outlet portion connected to an outlet pipe and a diverting portion connected to the inlet portion and the outlet portion, wherein the diverting portion comprises a sealed reservoir, a tubular member disposed at least partly in the diverting portion and the outlet portion, wherein the tubular member has an open end to which the measuring section adjoins, wherein the measuring section comprising fluid flow rate measuring means, and a connecting section for connecting the tubular member to the outlet pipe, wherein the inlet portion, the outlet portion and the diverting portion each having cross sectional areas relating to a cross sectional area of the pipe as from 1:1 to 4:1, wherein the diverting portion comprises at least one flow damper configured to attach the tubular member to walls of the sealed reservoir.

The present invention avoids the use of geometrically complex elements of the diverting unit, and the provision of a sealed reservoir eliminates the effect of periodic low-frequency oscillations associated with fluctuations in hydrostatic pressure. Furthermore, the invention eliminates the need to use long straight sections, and therefore reduces material expenditures and space required to arrange straight sections.

SUMMARY OF THE INVENTION

Measurement device for determining the flow rate of a fluid flowing in a pipe in a main flow direction, comprising a diverting unit connected to the pipe and adapted to divert the fluid flow from the axis of the main flow direction in the pipe and directing the flow to a measuring section, wherein the diverting unit is a sealed reservoir having an inlet portion connected to an inlet pipe, an outlet portion connected to an outlet pipe and a diverting portion connected to the inlet portion and outlet portion and comprising a tubular member disposed, at least partly, in the diverting portion and the outlet portion, wherein the tubular member has a measuring section provided with fluid flow rate measuring means, and a connecting section connecting the tubular member to the outlet pipe, wherein the ratio of the cross sectional area of each of the inlet portion, the outlet portion and the diverting portion to the cross sectional area of the pipe is from 1:1 to 4:1.

Furthermore, the inlet portion comprises an entrance port connected to the inlet pipe.

Furthermore, the outlet portion comprises an exit port connected to the outlet pipe.

Furthermore, the sealed reservoir is formed as a polyhedron, a body of revolution or a combination thereof.

Furthermore, the sealed reservoir is adapted to divert the fluid flow from the axis of the main flow direction at an angle of from 10° to 170°, and preferably at an angle of 90°.

In accordance with one embodiment the entrance port and the exit port are disposed on opposite sides of the reservoir relative to the axis of the main flow direction, preferably the entrance port and the exit port are disposed on the same axis with the main flow direction.

The tubular member may have a cross section shape selected from the group consisting of: circle, oval, square, rectangle, polygon, a curved shape or a combination thereof.

The tubular member has a curved shape in the longitudinal direction.

In embodiments, the tubular member may have a cross sectional area substantially equal to the cross sectional area of the pipe, or the tubular member may have a cross sectional area greater than the cross sectional area of the pipe or less than the cross sectional area of the pipe.

In one embodiment, the measuring section of the tubular member is at an angle of from 10° to 170° to the connecting section of the tubular member.

One end of the tubular member, to which the measurement section adjoins, is open and the other end at the connecting section is connected via the exit port of the reservoir to the pipe, wherein the measuring section of the tubular member extends parallel to side walls of the reservoir and is at an angle of preferably 90° to the connecting section of the tubular member.

The measuring section of the tubular member may have a length greater or smaller than that of the connecting section.

The measuring section may have the same length as the connecting section.

The fluid flow may be a flow containing gas, oil, water, or combinations thereof.

The sealed reservoir may further comprise at least one flow damper.

In the measuring device the inlet portion is a reservoir inlet duct, which is coaxial to the pipe and connected to the inlet pipe, the outlet portion is a reservoir outlet duct which is coaxial to the pipe and connected to the outlet pipe, and the diverting portion is a projecting cylinder-shaped portion having a closed end and disposed between the reservoir inlet duct and the reservoir outlet duct.

Furthermore, in the measuring device the inlet duct, the outlet duct and the projecting cylinder-shaped portion have the same cross-sectional area.

Furthermore, in the measuring device the distance between the attachment point of the inlet pipe to the inlet duct and the attachment point of the outlet pipe to the outlet duct is from 2 to 4 diameters of the pipe.

DETAILED DESCRIPTION OF EMBODIMENTS

Figure 1:
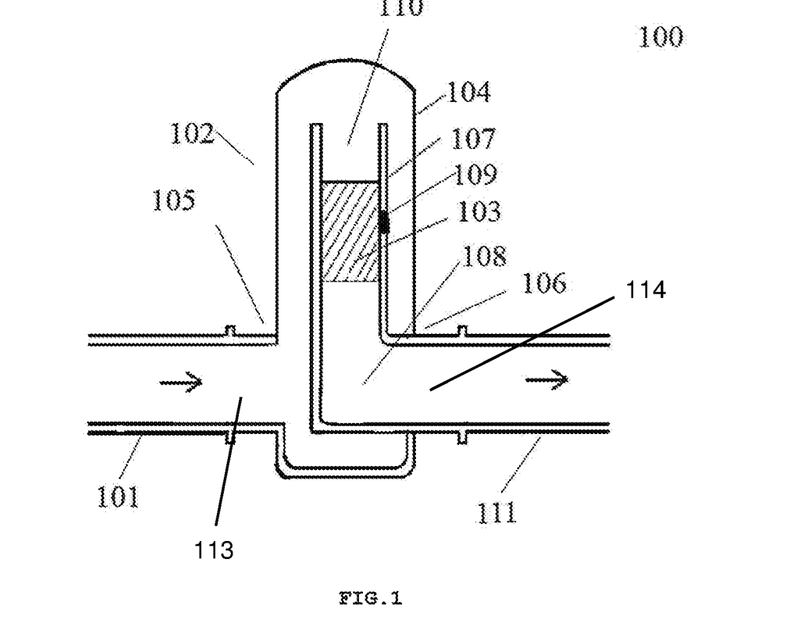
FIG. 1 shows an embodiment of a diverting unit with a sealed reservoir mounted at an angle of 90°.

FIG. 1 shows a measuring device (100) for determining the flow rate of a fluid flowing in a pipe (101), (111) in a main flow direction indicated by the arrow. The measuring device comprises a diverting unit (102) connected to the pipe and adapted to divert the fluid from the axis of the main flow direction in the pipe and directing the flow to a measuring section (103). Preferably, the diverting unit is mounted at an angle of 90° to the main flow direction.

With reference to FIG. 1, the diverting unit comprises a sealed reservoir (104) mounted along the fluid flow. The sealed reservoir may be formed as a polyhedron, or a body of rotation; preferably, the sealed reservoir may be an elongated cylinder, the end faces of which have a surface of a body of revolution, in particular, are part of a sphere. The sealed reservoir may consist of several parts, for example, to form a combination of a polyhedron and a body of rotation, which are connected by thread or bolted connection.

The sealed reservoir may be manufactured by any conventional method, for example, by welding, forging or stamping a steel sheet. Furthermore, the sealed reservoir may also be made of any suitable material that can withstand the fluid pressure and exhibits a sufficient corrosion resistance, for example, it may be made of a polymeric or composite material.

The ratio between a linear dimension of the cross section of the pipe, in particular, the diameter of the pipe, and the height of the sealed reservoir is from 1:2 to 1:20, preferably 1:10.

The sealed reservoir comprises an inlet portion (105) having an entrance port (113) through which fluid from the inlet pipe (101) enters the sealed reservoir for subsequent measurement of flow rate. The entrance port is connected to the inlet pipe (101) by fittings and flanges having bolt connection to facilitate replacement of a defective diverting unit, for example, due to failure of measuring instrumentation. Any other conventional connection may also be used. The sealed reservoir comprises an outlet portion (106)

having an exit port (114) through which the fluid that has passed through the measuring section (103) and the connecting section (108) of the tubular member extending through the outlet part (106) of the reservoir exits the sealed reservoir and enters the outlet pipe (111). The measuring section (103) and the connecting section (108) may be formed integrally.

The ratio of the cross-sectional area of each of the inlet portion, the outlet portion and the diverting part to the cross sectional area of the pipe is from 1:1 to 4:1, preferably from 1.5:1 to 3:1.

Preferably, the entrance port (113) and the exit port (114) lie on the same axis that is parallel to or coincident with the axis of the main flow direction, as shown in FIG. 1.

Figure 2:
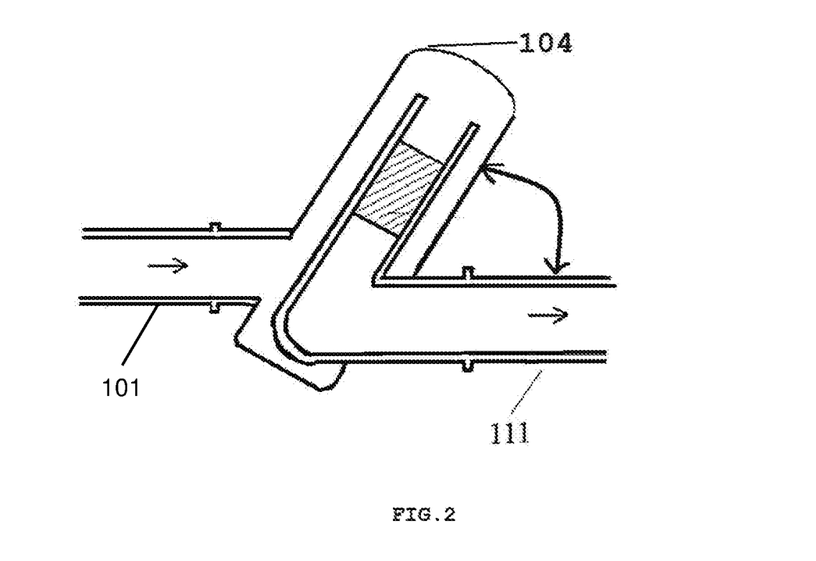
FIG. 2 is an embodiment of a diverting unit with a sealed reservoir mounted at an angle different from 90°.

FIG. 2 shows an embodiment, in which the sealed reservoir (104) is mounted at an angle to the axis of the main flow direction through the pipe (101), (111); this embodiment allows diverting the flow at an angle of from 10° to 170°.

Figure 3:
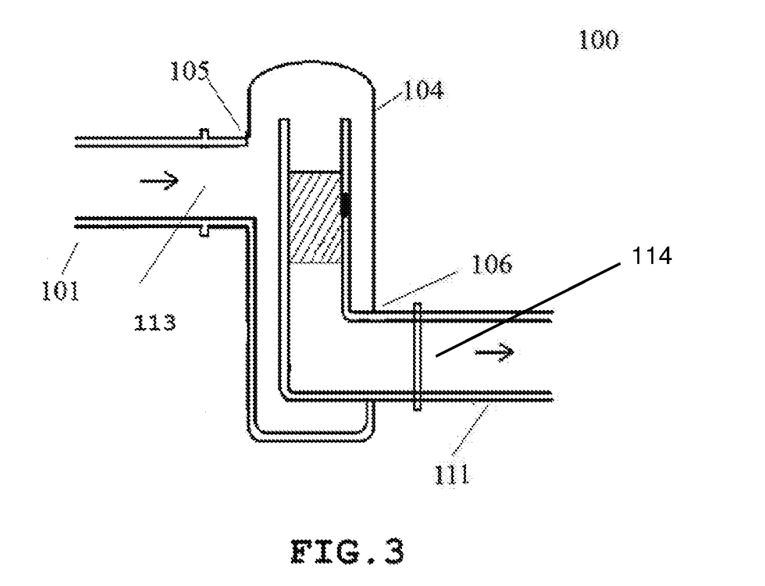
FIG. 3 is an embodiment of a diverting unit with a sealed reservoir, in which the entrance port and the exit port of the sealed reservoir are disposed on opposite sides of the reservoir, and the entrance port is disposed higher than the exit port.

FIG. 3 shows an embodiment, in which the entrance port (113) and the exit port (114) may be disposed on opposite sides of the sealed reservoir relative to the axis of the main flow, for example, the entrance port may be lower or higher than the main flow axis.

As shown in FIG. 1, a tubular member (107) is accommodated in the sealed reservoir and has an open end (110) through which the fluid entering the sealed reservoir (104) from the inlet pipe (101) is directed for measuring to the measuring section (103) and then, via the connecting section (108) of the tubular member (107) and the exit port (114), is sent to the outlet pipe (111). The measuring section (103) of the tubular member is provided with measuring means (109) which are intended for measurement of fluid characteristics, e.g. the measuring means can comprise at least one ultrasonic transceiver. The tubular member may have any cross section shape, such as square, oval, circle, polygon, and may also have a curved sectional shape, and any combination thereof. The tubular member may be curvilinear in the longitudinal direction. The tubular member has a larger or smaller cross sectional area than that of the pipe. Preferably, the tubular member has a cross sectional area substantially equal to that of the pipe.

One end (OE) of the tubular member, to which the measuring section (103) adjoins, is open and the other end on the connecting section is connected to the exit port (114) and further to the outlet pipe (111); the measuring section (103) of the tubular member preferably extends parallel to side walls of the reservoir and is angled preferably at 90° to the connecting section of the tubular member. In this design, fluid enters the inlet portion of the reservoir through the entrance port, turns into the space between the tubular member and the wall of the sealed reservoir, and enters the open end (OE) of the tubular member and then, through the connecting section of the tubular member and the exit port (114), enters the outlet pipe (111) and continues movement in the main flow direction of the fluid.

Figure 4:
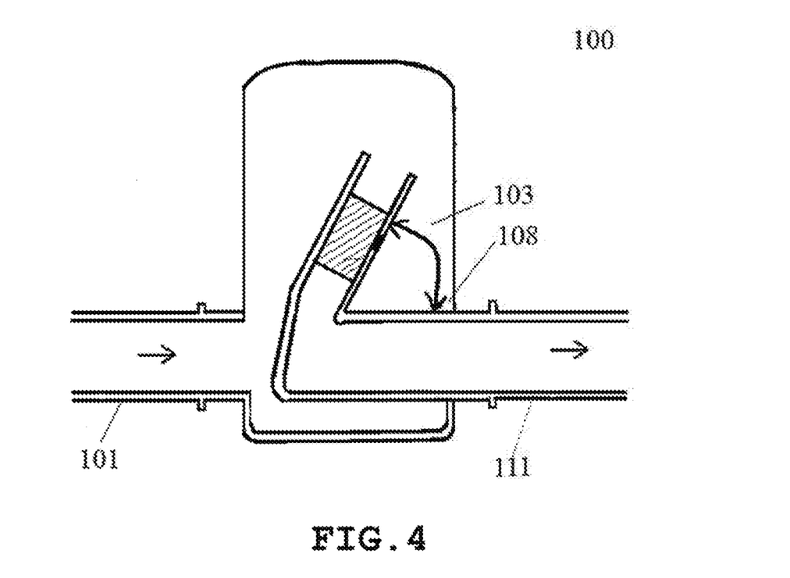
FIG. 4 is an embodiment of a diverting unit with a sealed reservoir mounted at an angle of 90° to the axis of the pipe, in which the measuring section is not parallel to the side walls of the reservoir and is disposed at an angle different from 90° to the connecting section.

The measuring section (103) may be arranged at an angle of from 10° to 170° to the connecting section (108). FIG. 4 shows an embodiment, in which the measuring section (103) is arranged at an angle different from 90° to the connecting section (108).

Figure 5:
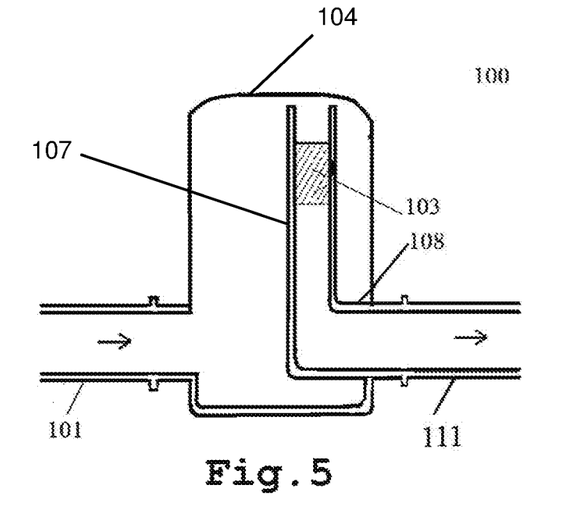
FIG. 5 shows an embodiment, in which the length of the measuring section is greater than the length of the connecting section, and the axis of the tubular member is displaced relative to the central axis of the sealed reservoir.
Figure 6:
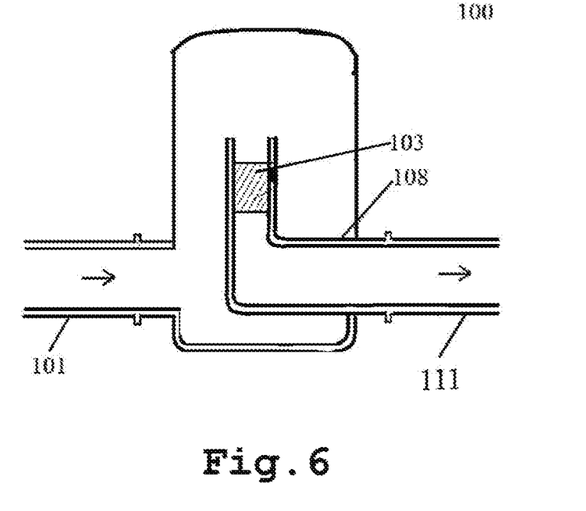
FIG. 6 shows an embodiment, in which the length of the measuring section is less than the length of the connecting section.
Figure 7:
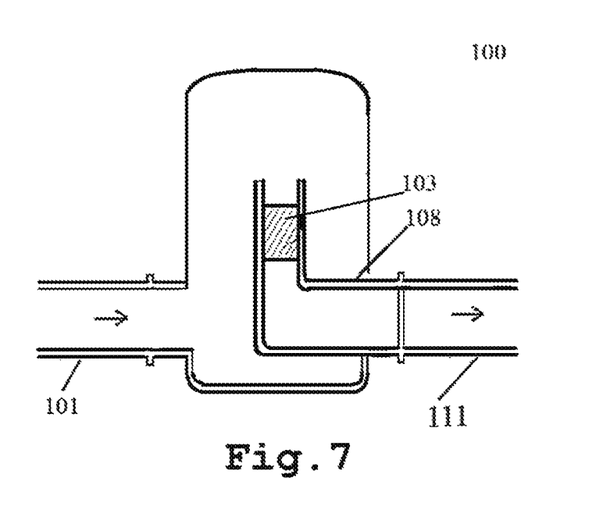
FIG. 7 shows an embodiment, in which the length of the measuring section is substantially equal to the length of the connecting section.

In the embodiment shown in FIG. 5 the length of the measuring section is greater than the length of the connecting section, and the tubular member is mounted such that the axis of the tubular member is displaced relative to the central axis of the sealed reservoir. In another embodiment shown in FIG. 6 the length of the measuring section is less than the length of the connecting section. In the embodiment of FIG. 7 the length of the measuring section is substantially equal to the length of the connecting section.

Figure 8:
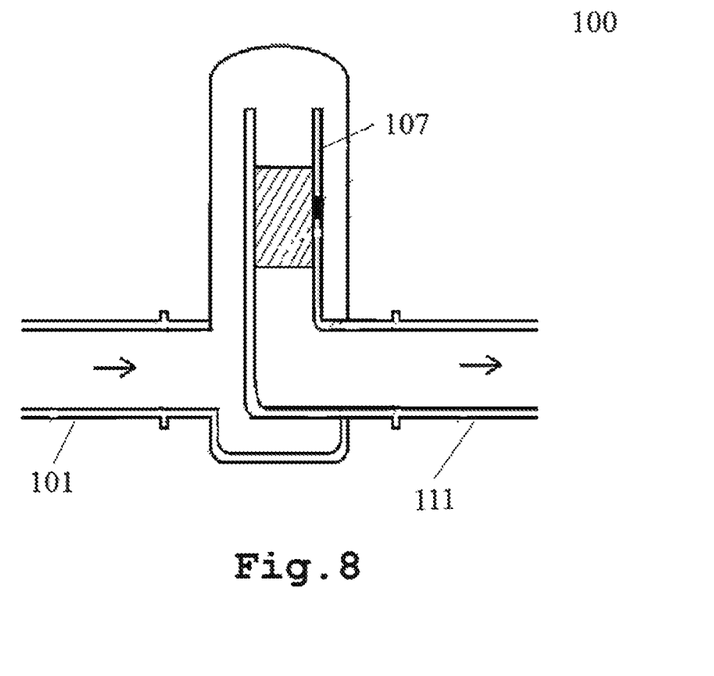
FIG. 8 shows an embodiment, in which a tubular member (107) has a cross sectional area substantially equal to that of the pipe (101), (111).

FIG. 8 shows an embodiment in which the tubular member (107) has a cross sectional area substantially equal to that of the pipe (101), (111).

Figure 9:
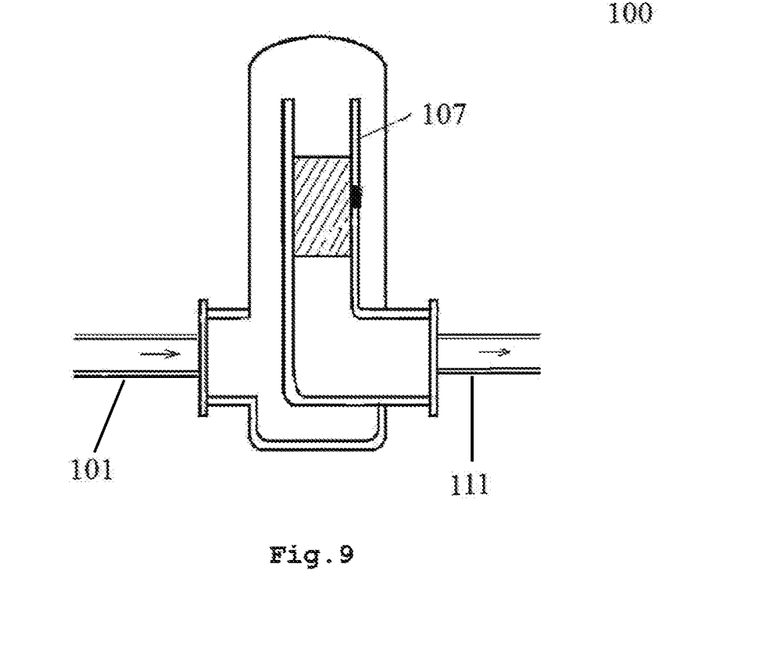
FIG. 9 shows an embodiment, in which a tubular member (107) has a cross sectional area greater than that of the pipe (101), (111).

FIG. 9 shows an embodiment in which a tubular member (107) has a cross sectional area greater than that of the pipe (101), (111).

Figure 10:
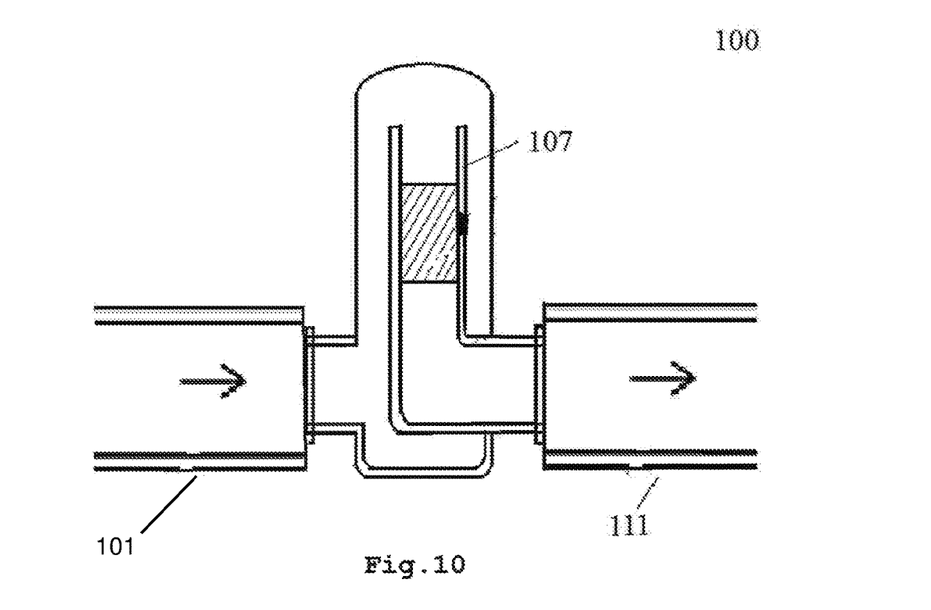
FIG. 10 shows an embodiment, in which a tubular member (107) has a cross sectional area less than that of the pipe (101), (111).

FIG. 10 shows an embodiment in which a tubular member (107) has a cross sectional area less than that of the pipe (101), (111).

Figure 11:
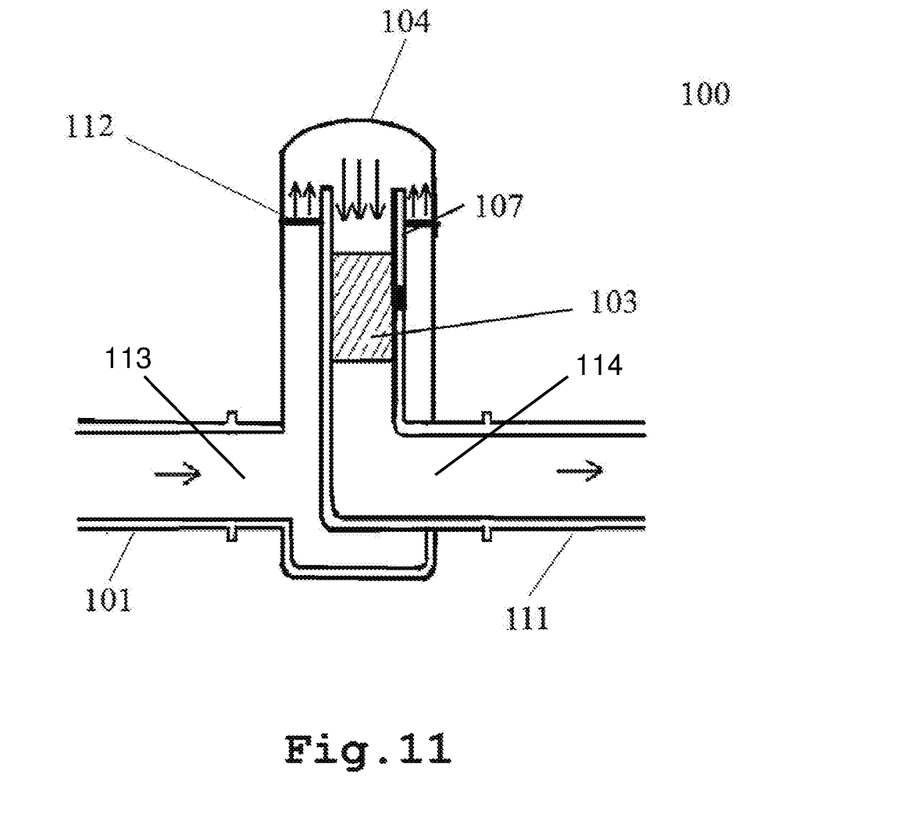
FIG. 11 shows an embodiment, in which a sealed reservoir (104) is further provided with a flow damper (112).

In an embodiment illustrated in FIG. 11 a sealed reservoir (104) further comprises a flow damper (112) formed, for example, of a perforated sheet that divides the main fluid flow coming out from the entrance port and prior to entering the measuring section into a plurality of finer flows. The flow damper may have longitudinal slits or openings, or may be formed of plates mounted parallel to the flow. The liquid flow damper greatly improves the conditions for the formation of a jet. It divides the fluid flow moving through the channel into a plurality of parts and promotes quenching the disturbances occurring in the flow approaching the damper, and also levels the longitudinal velocities and damps the energy of turbulent perturbations. Additionally, the tubular member (107) may be attached to the walls of the sealed reservoir via the flow damper (112), for example by soldering or welding or any other method known in the art. The additional attachment of the tubular member provides its reliable fixation and thus reduces the errors caused by oscillations of the tubular member under the effect of the fluid flow and improves the accuracy of fluid flow rate measurement.

Figure 12:
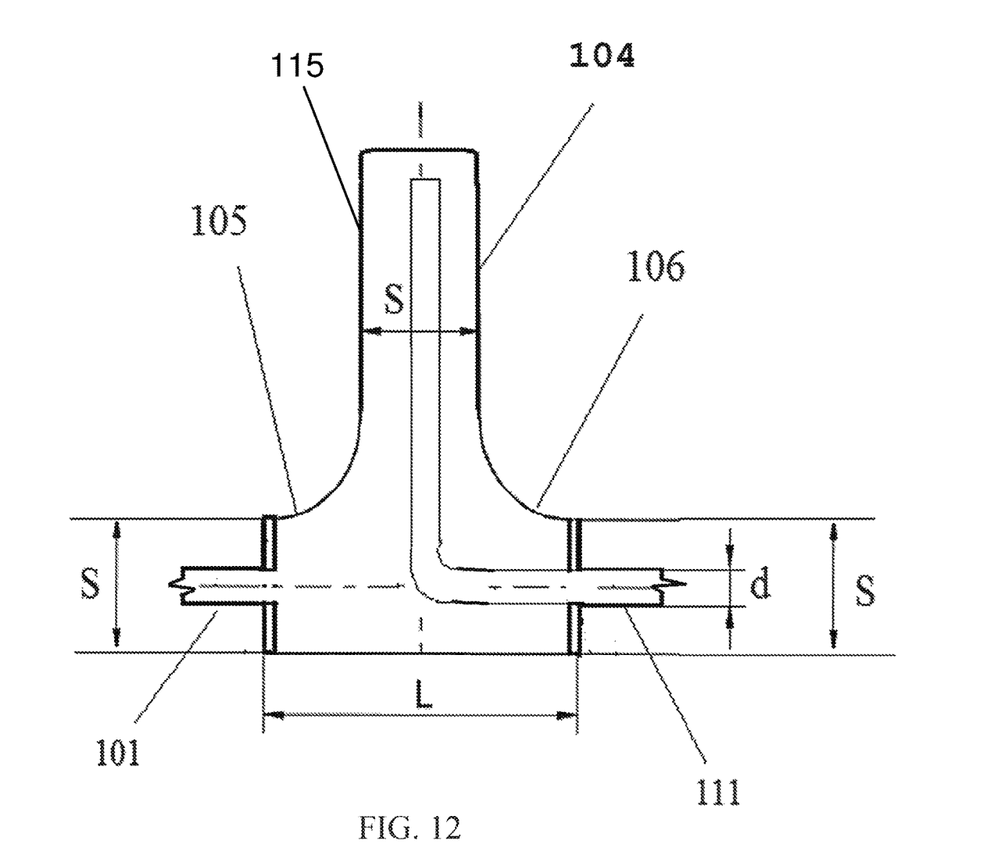
FIG. 12 shows an embodiment, in which the inlet portion (105) is a reservoir inlet duct, which is coaxial to the pipe and connected to the inlet pipe (101), the outlet portion (106) is a reservoir outlet duct, which is coaxial to the pipe and connected to the outlet pipe (111), and the diverting portion is a projecting cylinder-shaped portion (115) having a closed end and disposed between the reservoir inlet duct and the reservoir outlet duct.

In accordance with an embodiment illustrated in FIG. 12, a sealed reservoir comprises an inlet portion (105), which is a reservoir inlet duct coaxial with the pipe and connected to an inlet pipe (101); an outlet portion (106) which is a reservoir outlet duct coaxial with the pipe and connected to the outlet pipe (111), and a diverting portion formed as a projecting cylinder-shaped portion (115) having a closed end and disposed between the reservoir inlet duct and the reservoir outlet duct.

Furthermore, the inlet duct, the outlet duct and the projecting cylinder-shaped portion (115) have the same cross-sectional area S.

Distance L between the attachment point of the inlet pipe (101) to the inlet duct and the attachment point of the outlet pipe (111) to the outlet duct is from 2 to 4 diameters d of the pipe (101), (111).

The sealed reservoir may be produced by welding together the projecting cylinder-shaped portion (115), the reservoir inlet duct and the reservoir outlet duct.

The sealed reservoir may be manufactured as a single piece, for example by casting the projecting cylinder-shaped portion (115), the reservoir inlet duct and the reservoir outlet duct.

The projecting cylinder-shaped portion (115), the reservoir inlet duct and the reservoir outlet duct may be made of the same material or a combination of different materials.

In one embodiment, the inlet duct, the outlet duct, and the projecting cylinder-shaped portion (115) can be connected at any angle to the direction of flow.

In particular, a sealed reservoir according to the invention can be based on a tubular tee connector having an inlet portion, an outlet portion and a lateral fitting. To form the diverting portion of the sealed reservoir an additional cylinder-shaped member having a closed end and an open end is connected to the tee, the open end being connected to an opening in the lateral fitting of the tee connector, and the closed end forming a closed end of the diverting portion of the reservoir. The inlet portion of the tee connector is used as the inlet portion of thus obtained sealed reservoir, and the outlet portion of the tee is used as the outlet portion of the reservoir.

The invention claimed is:

1. Measurement device for determining the flow rate of a fluid flowing in a pipe in a main flow direction, comprising a diverting unit connected to the pipe and adapted to divert the fluid flow from the axis of the main flow direction in the pipe and directing the flow to a measuring section, wherein the diverting unit comprises an inlet portion connected to an inlet pipe, an outlet portion connected to an outlet pipe and a diverting portion connected to the inlet portion and the outlet portion, wherein the diverting portion comprises a sealed reservoir, a tubular member disposed at least partly in the diverting portion and the outlet portion, wherein the tubular member has an open end to which the measuring section adjoins, wherein the measuring section comprising fluid flow rate measuring means, the fluid flow rate measuring means being positioned within the tubular member, and a connecting section for connecting the tubular member to the outlet pipe, wherein the inlet portion, the outlet portion and the diverting portion each having cross sectional areas relating to a cross sectional area of the pipe as from 1:1 to 4:1, wherein the diverting portion comprises at least one flow damper configured to attach the tubular member to walls of the sealed reservoir.

2. Measurement device according to claim 1, wherein the inlet portion comprises an entrance port connected to the inlet pipe.

3. Measurement device according to claim 1, wherein the outlet portion comprises an exit port connected to the outlet pipe.

4. Measurement device according to claim 1, wherein the sealed reservoir is formed as a polyhedron, a body of revolution or a combination thereof.

5. Measurement device according to claim 4, wherein the sealed reservoir is adapted to divert the fluid flow from the axis of the main flow direction preferably at an angle of 90°.

6. Measurement device according to claim 1, wherein the sealed reservoir is adapted to divert the fluid flow from the axis of the main flow direction at an angle of from 10° to 170°.

7. Measurement device according to claim 1, wherein the entrance port and the exit port are disposed on opposite sides of the reservoir relative to the axis of the main flow direction.

8. Measurement device according to claim 1, wherein the entrance port and the exit port are disposed on the same axis with the main flow direction.

9. Measurement device according to claim 1, wherein the tubular member has a cross section shape selected from the group consisting of: circle, oval, square, rectangle, polygon, a curved shape or a combination thereof.

10. Measurement device according to claim 1, wherein the tubular member has a curved shape in the longitudinal direction.

11. Measurement device according to claim 1, wherein the tubular member has a cross sectional area substantially equal to the cross sectional area of the pipe.

12. Measurement device according to claim 1, wherein the tubular member has a cross sectional area greater than the cross sectional area of the pipe.

13. Measurement device according to claim 1, wherein the tubular member has a cross sectional area less than the cross sectional area of the pipe.

14. Measurement device according to claim 1, wherein the measuring section of the tubular member is at an angle of from 10° to 170° to the connecting section of the tubular member.

15. Measurement device according to claim 14, the other end of the tubular member at the connecting section is connected via the exit port of the outlet portion to the pipe, the measuring section of the tubular member extends parallel to side walls of the diverting portion and is at an angle of preferably 90° to the connecting section of the tubular member.

16. Measurement device according to claim 1, wherein the length of the measuring section is greater than the length of the connecting section.

17. Measurement device according to claim 1, wherein the length of the measuring section is less than the length of the connecting section.

18. Measurement device according to claim 1, wherein the length of the measuring section is equal to the length of the connecting section.

19. Measurement device according to claim 1, wherein the fluid flow contains gas, oil, water, or combinations thereof.

20. Measurement device according to claim 1, wherein the inlet portion is a reservoir inlet duct, which is coaxial to the pipe and connected to the inlet pipe, the outlet portion is a reservoir outlet duct which is coaxial to the pipe and connected to the outlet pipe, and the diverting portion is a projecting cylinder-shaped portion having a closed end and disposed between the reservoir inlet duct and the reservoir outlet duct.

21. Measurement device according to claim 20, wherein the inlet duct, the outlet duct and the projecting cylinder-shaped portion have the same or different cross-sectional area.

22. Measurement device according to claim 20, wherein the distance between an attachment point of the inlet pipe to the inlet duct and an attachment point of the outlet pipe to the outlet duct is from 2 to 4 diameters of the pipe.

* * * * *